United States Patent
Kaveri Poompatnam Chandrasekaran et al.

(10) Patent No.: US 12,524,221 B2
(45) Date of Patent: Jan. 13, 2026

(54) LOW-DISRUPTION MAINTENANCE OF CLUSTER INFRASTRUCTURE

(71) Applicant: GM Cruise Holdings LLC, San Francisco, CA (US)

(72) Inventors: Nitish Krishna Kaveri Poompatnam Chandrasekaran, Pleasanton, CA (US); Jonathan Langefeld, Lathrop, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 156 days.

(21) Appl. No.: 18/175,913

(22) Filed: Feb. 28, 2023

(65) Prior Publication Data

US 2024/0289111 A1    Aug. 29, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/65; G06F 8/71
USPC ........................................................ 717/168
See application file for complete search history.

(56) References Cited

U.S. PATENT DOCUMENTS

| | | | | |
|---|---|---|---|---|
| 9,286,052 | B1 * | 3/2016 | Solan | G06F 8/65 |
| 10,379,908 | B2 * | 8/2019 | Vyas | G06F 9/5005 |
| 10,824,489 | B2 * | 11/2020 | Caldato | G06F 8/60 |
| 11,194,620 | B2 * | 12/2021 | Koehler | G06F 9/5077 |
| 12,056,478 | B2 * | 8/2024 | Torres | G06F 11/3612 |
| 12,086,649 | B2 * | 9/2024 | Darji | H04L 12/12 |

(Continued)

FOREIGN PATENT DOCUMENTS

| | | | |
|---|---|---|---|
| CN | 110780998 A | * | 2/2020 |
| CN | 113031993 A | * | 6/2021 |

OTHER PUBLICATIONS

Jakob Schrettenbrunner "Migrating Pods in Kubernetes"; Abschlussarbeit zur Erlangung des akademischen Grades Master of Science (M.Sc.); Dec. 22, 2020—Hochschule Darmstadt, University of Applied Sciences.*

(Continued)

*Primary Examiner* — Francisco J Aponte
(74) *Attorney, Agent, or Firm* — Honigman LLP; Matthew H. Szalach; Jonathan P. O'Brien

(57) ABSTRACT

Applications supporting operations of an autonomous vehicle fleet can be implemented on and supported by cluster infrastructure. Demands on the cluster infrastructure from these systems can vary greatly and change often. Specifications for the hardware and software for the cluster infrastructure may be updated frequently. Therefore, significant resources can be spent to maintain the cluster infrastructure. If not managed or monitored properly, some changes to the cluster infrastructure may cause disruption to the systems running on the cluster infrastructure. The process of managing the upgrades to the cluster infrastructure can be laborious. To address at least some of these concerns, a computer-implemented operator can determine a migration plan based on the systems that are running on the cluster infrastructure. A windowed and monitored migration can be carried out by the computer-implemented operator to minimize disruption and to reduce over usage of resources in the cluster infrastructure during the migration.

18 Claims, 8 Drawing Sheets

(56) References Cited

U.S. PATENT DOCUMENTS

| | | | | |
|---|---|---|---|---|
| 2011/0071876 | A1* | 3/2011 | Fong | G06Q 10/06311 |
| | | | | 705/7.26 |
| 2016/0306581 | A1* | 10/2016 | Belgaied | G06F 3/0605 |
| 2019/0250946 | A1* | 8/2019 | Parameshwaran | G06F 9/5088 |
| 2020/0133706 | A1* | 4/2020 | Koehler | G06F 9/45558 |
| 2020/0151018 | A1* | 5/2020 | Jha | G06F 9/4856 |
| 2020/0153898 | A1* | 5/2020 | Sabath | G06F 9/4856 |
| 2020/0356397 | A1* | 11/2020 | Kumatagi | H04L 47/125 |
| 2022/0244997 | A1* | 8/2022 | Abdelsalam | G06F 9/5077 |
| 2022/0417093 | A1* | 12/2022 | Lindholm | H04L 61/5007 |
| 2023/0004370 | A1* | 1/2023 | Seth | G06F 9/5088 |
| 2023/0062582 | A1* | 3/2023 | Avadhanam | G06F 12/1458 |
| 2023/0104568 | A1* | 4/2023 | Miriyala | H04L 45/42 |
| | | | | 718/104 |
| 2023/0229477 | A1* | 7/2023 | Lin | H04W 24/02 |
| | | | | 718/1 |
| 2023/0342496 | A1* | 10/2023 | Doshi | G06F 21/6281 |
| 2024/0080277 | A1* | 3/2024 | Lee | H04L 67/60 |
| 2024/0129161 | A1* | 4/2024 | Miriyala | H04L 41/122 |
| 2024/0241760 | A1* | 7/2024 | Zhao | G06F 9/5077 |
| 2024/0244088 | A1* | 7/2024 | Bhandaru | G06F 21/577 |
| 2024/0289111 | A1* | 8/2024 | Kaveri Poompatnam Chandrasekaran | G06F 9/455 |

OTHER PUBLICATIONS

Panda, Sourav, K. K. Ramakrishnan, and Laxmi N. Bhuyan. "pmach: Power and migration aware container scheduling." 2021 IEEE 29th International Conference on Network Protocols (ICNP). IEEE, 2021.*

Gulotta, Dario Paolo. Real time, dynamic cloud offloading for self-driving vehicles with secure and reliable automatic switching between local and edge computing. Diss. Politecnico di Torino, 2023.*

*Add and Manage Node Pools*, Retrieved Jan. 8, 2023, 9 pages, https://cloud.google.com/kubernetes-engine/docs/how-to-/node-pools.

*Keynote: Welcome + Opening Remarks*, Retrieved Feb. 27, 2023, 3 pages. https://kccncna2002.sched.com/event/182L4/keynote-welcome-opening-remarks-priyanka-sharman-executive-director-cloud-native-computing-foundation.

*Custom Resources*, Retrieved Jan. 9, 2023, 8 pages, https://kubernetes.io/docs/concepts/extend-kubernetes/api-extension/custom-resources/.

*Creating Worker Nodes with Updated Properties*, Oracle Cloud Infrastructure Documentation, Retrieved on Jan. 8, 2023, 2 pages, https://docs.oracle.com/en-us/iaas/content/conteng/task/contengupgradingimageworkernode.htm.

*About Node Pools*, Retrieved Jan. 8, 2023, 4 pages, https://cloud.google.com/kubernetes-engine/docs/concepts/node-pools.

*Upgrading the Kubernetes Version on Workers Nodes in a Cluster*, Oracle Cloud Infrastructure Documentation, Retrieved Jan. 8, 2023, 2 pages, https://docs.oracle.com/en-us/iaas/content/conteng/task/contengupgradingk8sworkernode.htm.

*Modifying Node Pool and Worker Node Properties*, Oracle Cloud Infrastructure Documentation, Retrieved Jan. 8, 2023, 8 pages, https://docs.oracle.com/en-us/iaas/content/conteng/task/contengmodifyingnodepool.htm#Modifying_Node_Pool_and_Worker_Node-Properties.

*Standard Cluster Architecture*, Retrieved Jan. 8, 2023, 8 pages, https://cloud.google.com/kubernetes-engine/docs/concepts/cluster-archiecture#nodes.

* cited by examiner

LOW-DISRUPTION MAINTENANCE OF CLUSTER INFRASTRUCTURE

BACKGROUND

Technical Field

The present disclosure generally relates to cluster infrastructure and, more specifically, to low-disruption maintenance of cluster infrastructure.

Introduction

Cluster infrastructure can include hardware and software resources deployed to support systems with high availability, scalability, and performance. Systems can be deployed on the cluster infrastructure, and the cluster infrastructure enables the systems to service requests being made to the systems.

Autonomous vehicles (AVs), also known as self-driving cars, and driverless vehicles, may be vehicles that use multiple sensors to sense the environment and move without human input. Technology in AVs may enable vehicles to drive on roadways and to accurately and quickly perceive the vehicle's environment, including obstacles, signs, and traffic lights. AV technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
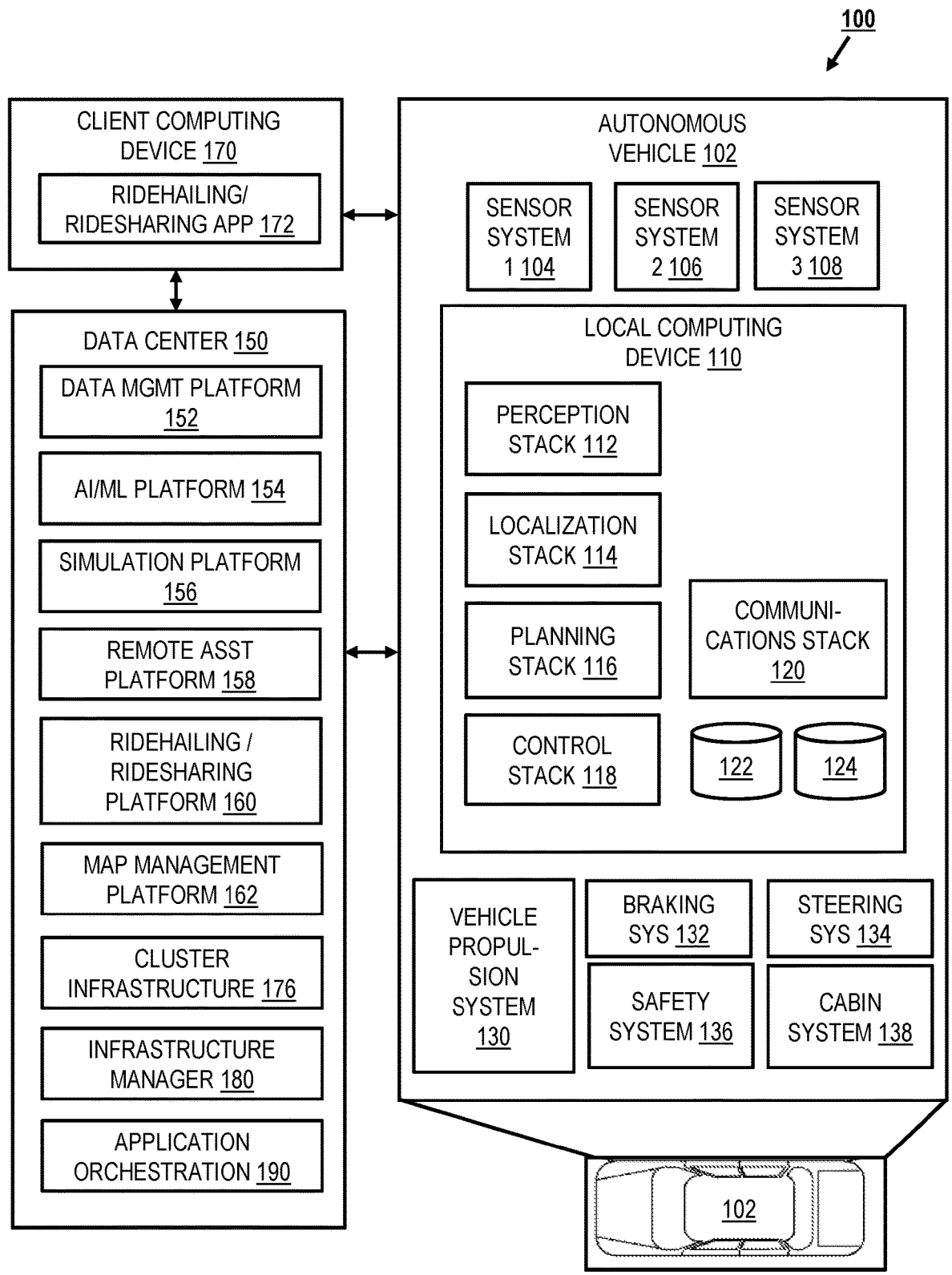
FIG. 1 illustrates an exemplary system environment that may be used to facilitate AV operations, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

Applications that support operations of an autonomous vehicle fleet can be implemented on and supported by cluster infrastructure. Examples of such applications (and platforms) are described with FIG. 1.

Demands on the cluster infrastructure from these systems can vary greatly and change often. Specifications for the hardware and software for the cluster infrastructure may be highly specialized and complex. The specifications may also be updated frequently. For example, cluster users (i.e., users implementing systems on the cluster infrastructure) may request to change the type of computing/processing resources, and/or a version of the computing/processing resources. In another example, the software resources of the cluster infrastructure has an outdated version and may need to be upgraded to a new version. In yet another example, security software may need to be updated or patched. While some changes to the specifications can be handled easily (e.g., increasing an amount of data storage), some other changes to the specifications of the cluster infrastructure can be disruptive to the systems that are running on the cluster infrastructure.

Therefore, significant resources can be spent to maintain the cluster infrastructure. If not managed or monitored properly, some changes to the cluster infrastructure may cause disruption to the systems running on the cluster infrastructure. The process of managing the upgrades to the cluster infrastructure and to minimize disruption can be laborious and tedious. A blue/green upgrade, manually performed by a cluster operator, to minimize disruption can take weeks and require full duplication of resources during the upgrade. As the number of clusters in the cluster infrastructure increase, resources needed to properly maintain the cluster infrastructure can also increase.

To address at least some of these concerns, a computer-implemented operator can be implemented to manage updates to the cluster infrastructure. Herein, the computer-implemented operator is called a node pool operator, and details of the node pool operator are described with FIGS. 2-7. The computer-implemented operator can complete a request to update the cluster infrastructure having a target specification by creating new resources that meet the target specification, and migrating systems on the existing cluster infrastructure in windowed fashion. The computer-implemented operator can determine a migration plan based on the systems that are running on the cluster infrastructure, so that the migration plan can be tailored to the systems that are running on the cluster infrastructure. The computer-implemented operator can carry out a windowed and monitored migration to minimize disruption and to reduce over usage of resources in the cluster infrastructure during the migration. Window size can be parameterizable to accommodate different sensitivities of the systems that are running on the cluster infrastructure.

Systems for an AV Fleet Supported by Cluster Infrastructure

To better understand the varied systems that can be implemented on cluster infrastructure, FIG. 1 illustrates an exemplary system environment that may be used to facilitate AV operations, according to some aspects of the disclosed technology.

One of ordinary skill in the art will understand that, for the AV management system 100 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 may communicate with one another over one or more networks.

AV 102 may navigate about roadways without a human driver based on sensor signals generated by multiple sensor systems 104, 106, and 108. The sensor systems 104-108 may include different types of sensors and may be arranged about the AV 102. For instance, the sensor systems 104-108 may comprise Inertial Measurement Units (IMUs), cameras (e.g., still image cameras, video cameras, etc.), light sensors (e.g., light detection and ranging (LIDAR) systems, ambient light sensors, infrared sensors, etc.), radio detection and ranging (RADAR) systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 may be a camera system, the sensor system 106 may be a LIDAR system, and the sensor system 108 may be a RADAR system. Other embodiments may include any other number and type of sensors.

AV 102 may also include several mechanical systems that may be used to maneuver or operate AV 102. For instance, the mechanical systems may include vehicle propulsion system 130, braking system 132, steering system 134, safety system 136, and cabin system 138, among other systems. Vehicle propulsion system 130 may include an electric motor, an internal combustion engine, or both. The braking system 132 may include an engine brake, a wheel braking system (e.g., a disc braking system that utilizes brake pads), hydraulics, actuators, and/or any other suitable componentry configured to assist in decelerating AV 102. The steering system 134 may include suitable componentry configured to control the direction of movement of the AV 102 during navigation. Safety system 136 may include lights and signal indicators, a parking brake, airbags, and so forth. The cabin system 138 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 may include one or more client interfaces (e.g., GUIs, Voice User Interfaces (VUIs), etc.) for controlling certain aspects of the mechanical systems 130-138.

AV 102 may additionally include a local computing device 110 that is in communication with the sensor systems 104-108, the mechanical systems 130-138, the data center 150, and the client computing device 170, among other systems. The local computing device 110 may include one or more processors and memory, including instructions that may be executed by the one or more processors. The instructions may make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, an HD geospatial database 122, and an AV operational database 124, among other stacks and systems. Collectively, a perception stack 112, a mapping and localization stack 114, a planning stack 116, a control stack 118 of the local computing device 110 may provide functionalities of an AV stack.

Perception stack 112 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 may detect and classify objects and determine their current and predicted locations, speeds, directions, and the like. In addition, the perception stack 112 may determine the free space around the AV 102 (e.g., to maintain a safe distance from other objects, change lanes, park the AV, etc.). The perception stack 112 may also identify environmental uncertainties, such as where to look for moving objects, flag areas that may be obscured or blocked from view, and so forth.

Mapping and localization stack 114 may determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 may compare sensor data captured in real-time by the sensor systems 104-108 to data in the HD geospatial database 122 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

The planning stack 116 may determine how to maneuver or operate the AV 102 safely and efficiently in its environment. For example, the planning stack 116 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 may select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 may manage the operation of the vehicle propulsion system 130, the braking system 132, the steering system 134, the safety system 136, and the cabin system 138. The control stack 118 may receive sensor signals from the sensor systems 104-108 as well as communicate with other stacks or components of the local computing device 110 or a remote system (e.g., the data center 150) to effectuate the operation of the AV 102. For example, the control stack 118 may implement the final path or actions from the multiple paths or actions provided by the planning stack 116. The implementation may involve turning the routes and decisions (e.g., a trajectory) from the planning stack 116 into commands for the actuators that control the AV's steering, throttle, brake, and drive unit.

The communication stack 120 may transmit and receive signals between the various stacks and other components of the AV 102 and between the AV 102, the data center 150, the client computing device 170, and other remote systems. The communication stack 120 may enable the local computing device 110 to exchange information remotely over a network. The communication stack 120 may also facilitate local exchange of information, such as through a wired connection or a local wireless connection.

The HD geospatial database 122 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 124 may store raw AV data generated by the sensor systems 104-108 and other components of the AV 102 and/or data received by the AV 102 from remote systems (e.g., the data center 150, the client computing device 170, etc.). In some embodiments, the raw AV data may include HD LIDAR point cloud data, image or video data, RADAR data, GPS data, and other sensor data that the data center 150 may use for creating or updating AV geospatial data.

The data center 150 may include cluster infrastructure 176, infrastructure manager 180 (e.g., software resources that manages the hardware resources of the cluster infrastructure 176), and application orchestration 190 (e.g., software that orchestrates deployments and maintenance of systems and services onto the cluster infrastructure 176).

Cluster infrastructure 176 may include hardware resources and software resources. Hardware resources can include computing/processing resources, data storage resources, network resources, etc. Examples of computing/processing resources may include machine-learning processors (e.g., machine-learning accelerators or neural processing unit), central processing units (CPUs), graphics processing units (GPUs), quantum computers, etc. Examples of data storage resources may include disk storage devices, memory storage devices, database servers, etc. Network resources may include network appliances (e.g., switches, routers, etc.), network connections, interconnects, etc. Software resources may include firmware for the hardware resources, operating systems for the hardware resources, virtual machines running on the hardware resources, software that manage the hardware resources, etc. Cluster infrastructure 176 may include resources managed by one or more providers.

Infrastructure manager 180 may include software on top of cluster infrastructure 176 that allows cluster operators to define and organize the underlying resources in cluster infrastructure 176. An infrastructure manager 180 may be provided by a provider of the cluster infrastructure 176 (e.g., native to the cluster infrastructure 176). An infrastructure manager 180 may be provided by third-party developers which are not a part of the provider of the cluster infrastructure 176 (e.g., not necessarily native to the cluster infrastructure 176 but can interface with the cluster infrastructure 176). An infrastructure manager 180 may be referred to Infrastructure-as-code (IaC). IaC may provision resources in cluster infrastructure 176 through machine-readable definition files.

Application orchestration 190 may include software that work with cluster infrastructure 176 and/or infrastructure manager 180 to deploy and maintain systems and services (sometimes referred to as applications) running on the cluster infrastructure 176. Application orchestration 190 may allow users of cluster infrastructure 176 to configure, deploy, coordinate, and manage applications on cluster infrastructure 176. Some application orchestration 190 may provide resource usage optimization, achieve certain quality of service parameters, and load balancing of the applications on cluster infrastructure 176. While not required, applications deployed on cluster infrastructure 176 can be containers (or containerized applications). A container means that the code and dependencies are packaged as a unit or image (e.g., having code, runtime, system tools, system libraries and settings) in such a way that the application can be created and run quickly on cluster infrastructure 176 regardless of the underlying cluster infrastructure environment.

The data center 150 may send and receive various signals to and from the AV 102 and the client computing device 170. These signals may include sensor data captured by the sensor systems 104-108, roadside assistance requests, software updates, ridesharing pick-up and drop-off instructions, and so forth.

In this example, the data center 150 includes one or more of a data management platform 152, an Artificial Intelligence/Machine-Learning (AI/ML) platform 154, a simulation platform 156, a remote assistance platform 158, a ridehailing/ridesharing platform 160, and a map management platform 162, among other systems. Many of these systems can be implemented and supported by cluster infrastructure 176.

The data center 150 having cluster infrastructure 176 may be a private cloud (e.g., an enterprise network, a co-location provider network, etc.), a public cloud (e.g., an infrastructure as a service (IaaS) network, a platform as a service (PaaS) network, a software as a service (SaaS) network, or other communication service provider (CSP) network), a hybrid cloud, a multi-cloud, and so forth. The data center 150 may include cluster infrastructure 176, which can include hardware and software resources remote to the local computing device 110 for managing a fleet of AVs and AV-related services. For example, in addition to managing the AV 102, the data center 150 may also support a ridehailing/ridesharing service, a delivery service, a remote/roadside assistance service, street services (e.g., street mapping, street patrol, street cleaning, street metering, parking reservation, etc.), sensor calibration, and the like.

Data management platform 152 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 may access data stored by the data management platform 152 to provide their respective services.

The AI/ML platform 154 may provide the systems for training and evaluating machine-learning algorithms for operating the AV 102 (e.g., machine-learning models used in the AV stack), the simulation platform 156, the remote assistance platform 158, the ridehailing/ridesharing platform 160, the map management platform 162, and other platforms and systems. Using the AI/ML platform 154, data scientists may prepare data sets from the data management platform 152; select, design, and train machine-learning models; evaluate, refine, and deploy the models; maintain, monitor, and retrain the models; and so on.

The simulation platform 156 may simulate (or mimic) and/or augment real-world conditions (e.g., roads, lanes, buildings, obstacles, other traffic participants (e.g., other vehicles, cyclists, and pedestrians), trees, lighting conditions, weather conditions, etc.) so that the AV stack of an AV may be tested in a virtual environment that is similar to a real physical world. The simulation platform 156 may create a virtual environment that emulates physics of the real-world and sensors of an AV. Testing and evaluating AVs in simulation platform 156 can be more efficient and allow for creation of specific traffic scenarios that may occur rarely in the real-world. Moreover, the AV stack can even be tested in thousands of scenarios in parallel in simulation. More specifically, the AV stack may be executed in a simulator simulating various traffic scenarios at a time. With simulation platform 156, the AV stack implementing the perception, prediction, planning, and control algorithms can be developed, evaluated, validated, and fine-tuned in a simulation environment. The simulation platform 156 can also be used to evaluate only a portion of the AV stack.

The remote assistance platform 158 may generate and transmit instructions to control the operation of the AV 102. For example, in response to active trigger(s) being detected by the local computing device 110 on the AV 102, the remote assistance platform 158 may respond by creating a remote assistance session with a remote assistance operator to assist the AV 102. The remote assistance platform 158 may, with assistance from the remote assistance operator, generate and transmit instructions to the AV 102 to cause the AV 102 to perform a special driving maneuver (e.g., to drive AV 102 in reverse). The remote assistance platform 158 may utilize the remote assistance session to communicate with a customer in the AV 102 via the client computing device 170 to resolve concerns of the customer.

The ridehailing/ridesharing platform 160 (e.g., a web application) may interact with a customer of a ridehailing/ridesharing service via a ridehailing/ridesharing application 172 executing on the client computing device 170. Ridehailing/ridesharing platform 160 may provide delivery services as well. The client computing device 170 may be any type of computing system, including a server, desktop computer, laptop, tablet, smartphone, smart wearable device, gaming system, or other general-purpose computing device for accessing the ridehailing/ridesharing application 172. The client computing device 170 may be a customer's mobile computing device or a computing device integrated with the AV 102 (e.g., the local computing device 110). The ridehailing/ridesharing platform 160 may receive requests to be picked up or dropped off from the ridehailing/ridesharing application 172, and dispatch the AV 102 for the trip. A similar platform can be provided for delivery services.

Map management platform 162 may provide a set of tools for the manipulation and management of geographic and spatial (geospatial) and related attribute data. The data management platform 152 may receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data may be processed, and map management platform 162 may render base representations (e.g., tiles (2D), bounding volumes (3D), etc.) of the AV geospatial data to enable users to view, query, label, edit, and otherwise interact with the data. Map management platform 162 may manage workflows and tasks for operating on the AV geospatial data. Map management platform 162 may control access to the AV geospatial data, including granting or limiting access to the AV geospatial data based on user-based, role-based, group-based, task-based, and other attribute-based access control mechanisms. Map management platform 162 may provide version control for the AV geospatial data, such as to track specific changes that (human or machine) map editors have made to the data and to revert changes when necessary. Map management platform 162 may administer release management of the AV geospatial data, including distributing suitable iterations of the data to different users, computing devices, AVs, and other consumers of HD maps. Map management platform 162 may provide analytics regarding the AV geospatial data and related data, such as to generate insights relating to the throughput and quality of mapping tasks.

Data management platform 152, AI/ML platform 154, simulation platform 156, remote assistance platform 158, ridehailing/ridesharing platform 160, map management platform 162 are some illustrative examples of applications that can be orchestrated by application orchestration 190 so that they can be deployed and implemented on cluster infrastructure 176. Demands and requirements on the cluster infrastructure 176 can differ widely from one application to another in terms of their specifications and complexity. As applications evolve and the number of applications grow over time, their demands and requirements may also change. Cluster operators of cluster infrastructure 176 may spend significant resources to keep up with changing demands and requirements.

The hardware and software technology of the cluster infrastructure 176 may also evolve over time (e.g., certain kinds/types of hardware resources may become obsolete as new kinds/types of hardware resources become available). Hardware resources in cluster infrastructure 176 may be updated from time to time to newer kinds/types of hardware resources or newer models of the same kind/type of hardware resources. Software resources in cluster infrastructure 176 may need to be updated to a new version or patched due to fixes. Cluster operators may change infrastructure manager 180 and use a different one offered by a different developer/provider if appropriate. Cluster operators may update the version of the infrastructure manager 180 and application orchestration 190.

For many reasons mentioned herein, it is not trivial to maintain cluster infrastructure 176. Updating certain aspects of cluster infrastructure 176 and/or properties of the resources of cluster infrastructure 176 easily with low-disruption can be a challenge.

Figure 2:
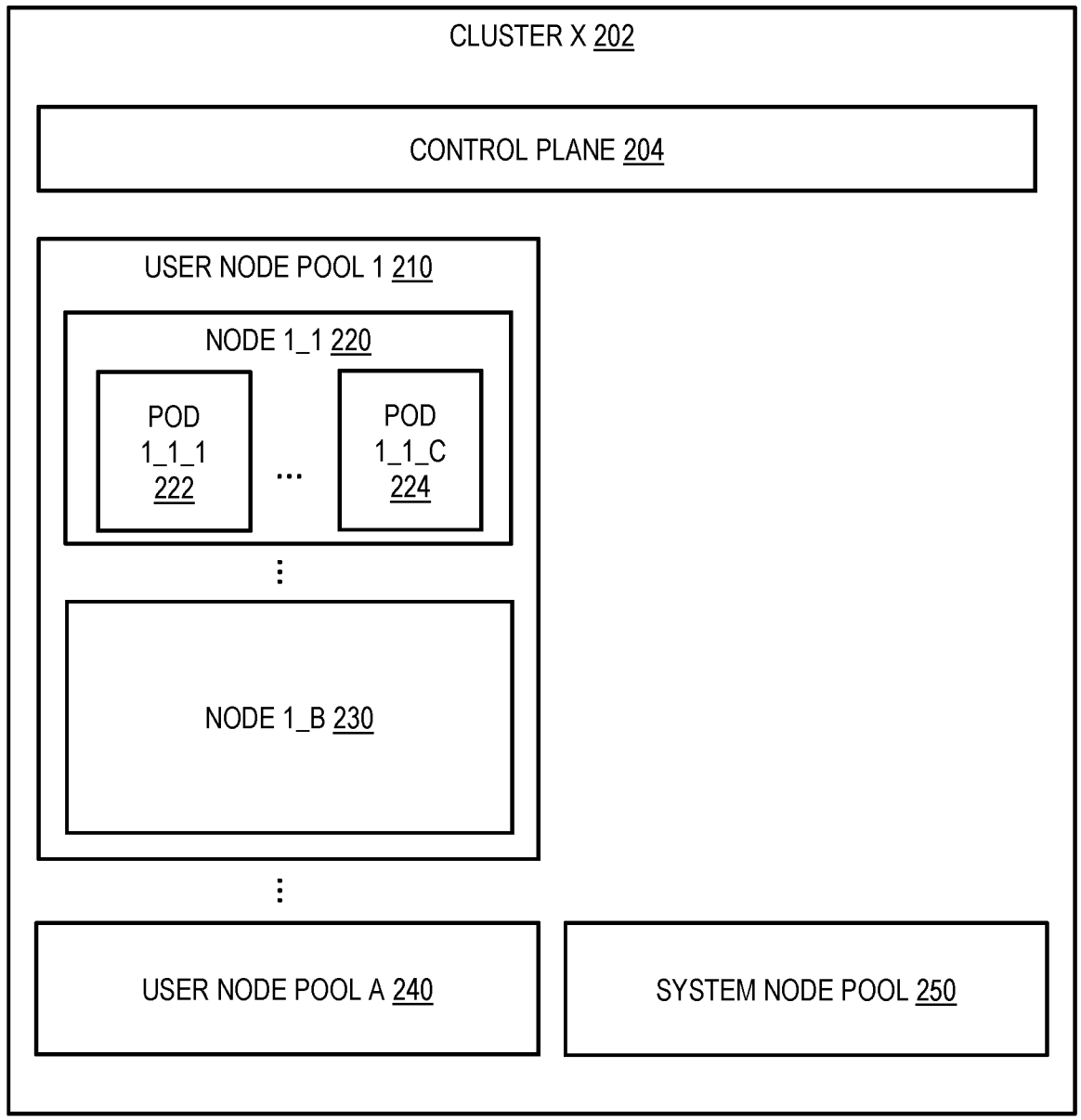
FIG. 2 illustrates an exemplary cluster, according to some aspects of the disclosed technology.

Exemplary Cluster and Exemplary Ways to Organize and Manage the Resources of a Cluster FIG. 2 illustrates an exemplary cluster, according to some aspects of the disclosed technology. For simplicity, a single cluster, e.g., cluster X 202, is illustrated. Aspects of the present disclosure can be applicable to scenarios where cluster operators are managing a plurality of clusters.

A cluster operator may define and provision resources in cluster X 202 using a suitable infrastructure manager (e.g., infrastructure manager 180 of FIG. 1) through machine-readable definition files. To create cluster X 202, a cluster operator may enumerate requirements of the cluster in a machine-readable definition file. Example requirements may include an identification of a cluster infrastructure provider, an identification of a region in which the cluster X 202 should be created, a number of instances of a particular kind/type of hardware resource, an identification of a particular kind/type of software resource, etc.

Functionalities of application orchestration (e.g., application orchestration 190 of FIG. 1) may be implemented by control plane 204, which can orchestrate deployment, maintenance, and scaling of applications on the resources in cluster X 202. Control plane 204 may service requests for application deployment and requests for maintaining applications running on cluster X 202. In some embodiments, control plane 204 may include persistent, lightweight, distributed key-value data store to store configuration data of cluster X 202, an application programming interface, a scheduler to assign unscheduled applications to a specific resource in the cluster X 202, one or more controllers each having a reconciliation loop, and a controller manager that manages the one or more controllers.

As illustrated in FIG. 2, control plane 204 may orchestrate applications onto resources in cluster X 202, which may be organized and managed by control plane 204 using nodes and optionally node pools.

Cluster X 202 may have one or more nodes. A node (also called a worker) may be a resource on which an application (e.g., systems, services, workloads, etc.) can be deployed. A node may include a virtual or physical machine. Virtual machines are machines that emulate physical machines, and are implemented on physical hardware. A node has a corresponding configuration. The configuration may include properties such as a machine type, a resource type, a specific operating system image, a minimum computing platform, amount of allocable data and/or computing resources for the node (also referred to as a shape of a node), a specific network interface, maximum number of applications that can run on the node, etc. The health/status of the node may be managed by control plane 204. A node pool may be a group of nodes within a cluster that all have the same configuration.

An application, e.g., a unit that can be handled by the scheduler in control plane 204 is referred to herein as a pod. A pod may include a containerized application. The scheduler may schedule pods to nodes or node pools based on the configurations and health/state of the nodes or node pools.

Cluster X 202 may include one or more user node pools, such as user node pool 1 210, . . . user node pool A 240 (for a total of A number of user node pools). These user node pools may be used by cluster users, who may submit requests to deploy pods onto nodes of these user node pools. A user node pool may have one or more nodes. For example, user node pool 1 210 may have B number of nodes, shown as node 1_1 220, . . . node 1_B 230.

Control plane 204 may schedule and deploy one or more pods on a given node. For example, node 1_1 220 may have C number of pods deployed thereon, such as pod 1_1_1 222, . . . pod 1_1_C 224.

In some cases, a dedicated set of resources are allocated for systems managed by cluster operators to support management of cluster X 202. The set of resources may include a system node pool 250. System node pool 250 may also include one or more nodes. Each node may have one or more pods deployed thereon. Having a system node pool 250 ensures applications to manage the cluster X 202 can be provided with access rights to the rest of the cluster X 202, and ensures high availability of the applications that may be critical for managing the cluster X 202. Usage and access to the system node pool 250 may be restricted to cluster operators only, and other users of the cluster may not be able to deploy applications onto the system node pool 250.

Once the configuration is defined for a node or nodes in a node pool, changing the configuration is not a straightforward task. As discussed previously, changes to the configuration may be prompted by new demands or requirements from cluster users, or changes to the configuration may be prompted by updates to the hardware and/or software resources of cluster X 202. While control plane 204 may support certain updates to mutable properties of the configuration of a node or nodes across a node pool, control plane 204 may not support updates to immutable properties of the configuration of a node or nodes across a node pool. An example of mutable properties of a node may include an amount of allocable data and/or computing resources for the node (e.g., a shape of a node). Examples of mutable properties of a node pool may include a name of the node pool, a size of a node pool (e.g., number of nodes). Examples of immutable properties of nodes or nodes across a node pool may include a machine type, a resource type, a specific operating system image, a minimum computing platform, a specific network interface, maximum number of applications that can run on the node, etc.

For changes to immutable properties of an existing node or nodes across a node pool, a new node or new node pool meeting a target specification may be created. Even if a new node or new node pool can be created, pods running on the existing node pool running on the existing node or nodes across a node pool may suffer from disruption during migration if migration is mishandled. Generally, a migration performed manually by cluster operators is time consuming, and a disruption-free migration may require full duplication of resources.

An Exemplary Node Pool Operator to Perform Well-Managed and Monitored Migration

To address some of the issues mentioned herein, a node pool operator can be implemented to manage updates to cluster infrastructure. Immutable properties effectively become mutable properties when a node pool operator is used to update those immutable properties. A node pool operator, as described herein, is not to be confused with a human operator. Node pool operator is a process implemented on hardware resources on the cluster infrastructure, to perform functionalities described herein.

Figure 3:
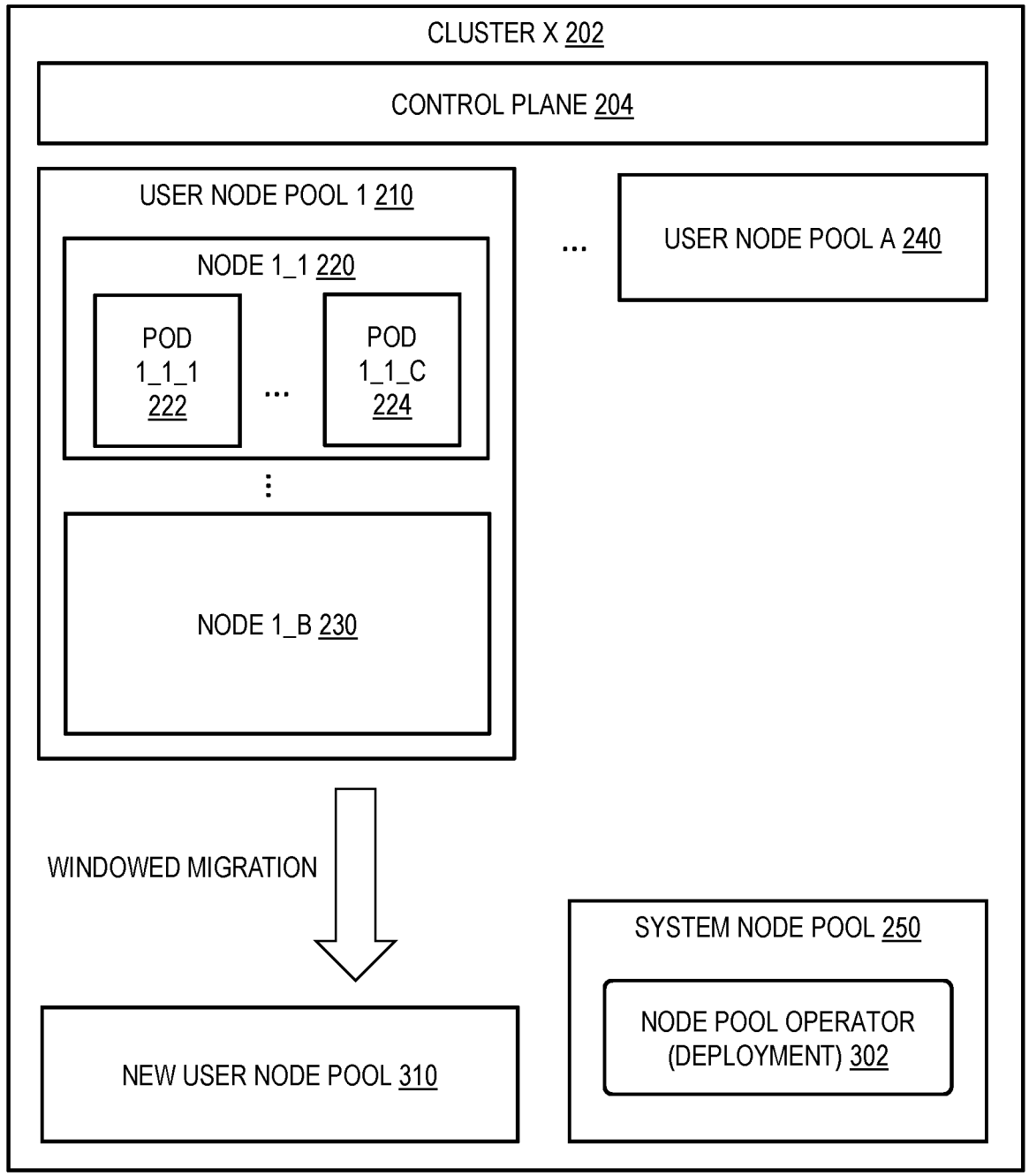
FIG. 3 illustrates an exemplary cluster having a node pool operator, according to some aspects of the disclosed technology.

FIG. 3 illustrates an exemplary cluster X 202 having a node pool operator 302, according to some aspects of the disclosed technology. As an illustrative example, node pool operator 302 may be implemented as a deployment on one or more nodes of cluster X 202. For example, node pool operator 302 may be deployed onto the system node pool 250. Implementing the node pool operator 302 as a deployment through application orchestration onto cluster X 202 makes the node pool operator 302 easy to deploy and allows the node pool operator 302 to easily manage node pools within cluster X 202.

A cluster operator may transmit a request to update an existing node pool, e.g., user node pool 1 210, to the node pool operator 302. In some cases, a request to update the user node pool 1 210 is triggered upon detecting that an update to the user node pool 1 210 is needed. The request may include or specify a target specification (e.g., a desired state) for the node pool. The target specification may represent a change in a current specification/configuration of the node pool (e.g., a change in a configuration of an existing node pool). The target specification may include one or more unchanged properties of the existing node pool and one or more updated properties of the existing node pool. In response to the request, node pool operator 302 may determine an appropriate migration plan, and carry out the determined migration plan. For example, the node pool operator 302 may create a new user node pool 310. The new user node pool 310 may be empty. Node pool operator 302 can perform and coordinate a windowed migration of pods on user node pool 1 210. Node pool operator 302 may cordon and/or drain nodes in the existing node pool. New nodes may be created in the new user node pool 310 in a windowed fashion, and pods running on the existing node pool may be migrated to the new nodes in the new user node pool 310 in a windowed fashion. Window size can be variable, and can depend on the pods that are running on the existing node pool. Node pool operator 302 may monitor the progress of the migration, and alert the cluster operator if appropriate. Events are also logged to offer visibility and traceability of the migration. Additional details of exemplary operations of node pool operator 302 are described with FIGS. 4-7.

In some embodiments, node pool operator 302 can be implemented or deployed as a custom controller (or a custom operator) and a custom resource. The custom controller can perform an active reconciliation process, where the custom controller can watch a desired state, and a current state. The custom controller may try and make the current state match or be more like the desired state. The custom controller may modify the real-world/current state to make the real-world/current state match or be more like the desired state. The desired state can be encoded in the custom resource. The desired state can correspond to the target specification defined by the request to update a node pool.

The custom controller can orchestrate tasks to be performed by workers. Examples of tasks may include creation of nodes or node pools, cordoning nodes, draining nodes, and migration of pods. The tasks to be performed by workers can forward the goal of making the current state more like the desired state. The tasks can be placed in a workqueue. A workqueue can be rate limited, which can ensure that only a fixed amount of resources are processed at a time, and to ensure that the same item is not being processed simultaneously in two different workers. A condition can be added to each task that a worker picks up. If the condition is not met, the worker can re-queue the task with an exponential back-off and picks up the next task. Also, having a workqueue allows multiple workers to work on different tasks at the same time.

The active reconciliation process of the custom controller may be implemented based on an edge-triggered, level-driven design pattern. Event handlers can be created to handle a minimal task, and a reconcile function can be called after every event and periodically to match the current state with the desired state. Such a design pattern may be more resilient to outages. The reconcile function may be idempotent, meaning that the reconcile function is able to match the current state with the desired state regardless of the current state or the desired state. Each time the reconcile function is called, the reconcile function is able to determine whether the function can call a next phase, or wait for the present phase to finish. A current migration phase can be stored in the status. Based on the current migration phase, the reconcile function can check whether a condition is met. If the condition is met, the reconcile function can call the next phase. The custom resource can be used to store events, which can inform cluster operators, e.g., when a new node pool is created, ready, updating, migrating, finished migrating, and deleted.

In some embodiments, the node pool operator 302 may include an admission controller to check whether a received request to update the existing node pool can be carried out by the node pool operator 302. Some changes to the cluster X 202 or region of cluster X 202 may be undesirable or forbidden. The admission controller can check whether the request to update the existing node pool has an undesirable or forbidden change. If such a change is requested, the request to update the existing node pool can be rejected.

Because the node pool operator 302 can be orchestrating a long running migration (e.g., days long), the likelihood of the custom controller of the node pool operator 302 crashing at some point is high. The tasks in the workqueue may be preferably stored in persistent storage external to the node pool operator 302 (e.g., in control plane 204), so that if the node pool operator 302 crashes and restarts, the custom controller of the node pool operator 302 can continue orchestration based on the same state of the workqueue. The node pool operator 302 going down during an operation may be recovered easily since the progress of the operation may be stored as part of the resource in persistent storage in control plane 204. Upon restarting the node pool operator 302, the node pool operator 302 can read the last operated state from persistent storage and restart the operation from the last operated state. The node pool operator 302 going down outside of an operation may be logged, and a cluster operator may be alerted if the node pool operator 302 is not restarted within a certain period of time (e.g., 5 minutes). The cluster operator may then examine the cause of the node pool operator 302 not restarting properly.

If the node pool operator 302 panics or crashes (encounters a runtime error or failure), state information of the node pool operator 302 and error log can be saved before exiting the node pool operator 302. A cluster operator may be alerted accordingly and saved information can be provided to the cluster operator. If implemented on the cluster as deployment, the node pool operator 302 may be restarted easily by application orchestration.

The node pool operator 302 could be restarted not due to the node pool operator 302 having an error, but due to other issues of the node on which the node pool operator 302 is deployed. To minimize the risk of other issues of the node affecting the node pool operator 302, the node pool that has the node pool operator 302 deployed on it (e.g., system node pool) can be tainted (e.g., flagged, tagged, or marked) such that only the node pool operator 302 can be deployed on it (no other pods can be deployed onto the same node pool). Also, it is possible to avoid using preemptive nodes (e.g., short lifespan, surplus) in the node pool that has the node pool operator 302 deployed on it.

In some cases, node pool operator 302 may get stuck due to node failures. A rollback can be triggered if the node pool operator 302 has been retrying a same phase or operation more than a maximum number of retries. A number of retries on a given phase or operation may be tracked and checked whether the number of retries meets a threshold. An error can be logged, and an alert can be triggered based on the logged error, and the alert can be transmitted to a cluster operator.

Exemplary Functions of the Node Pool Operator

Figure 4:
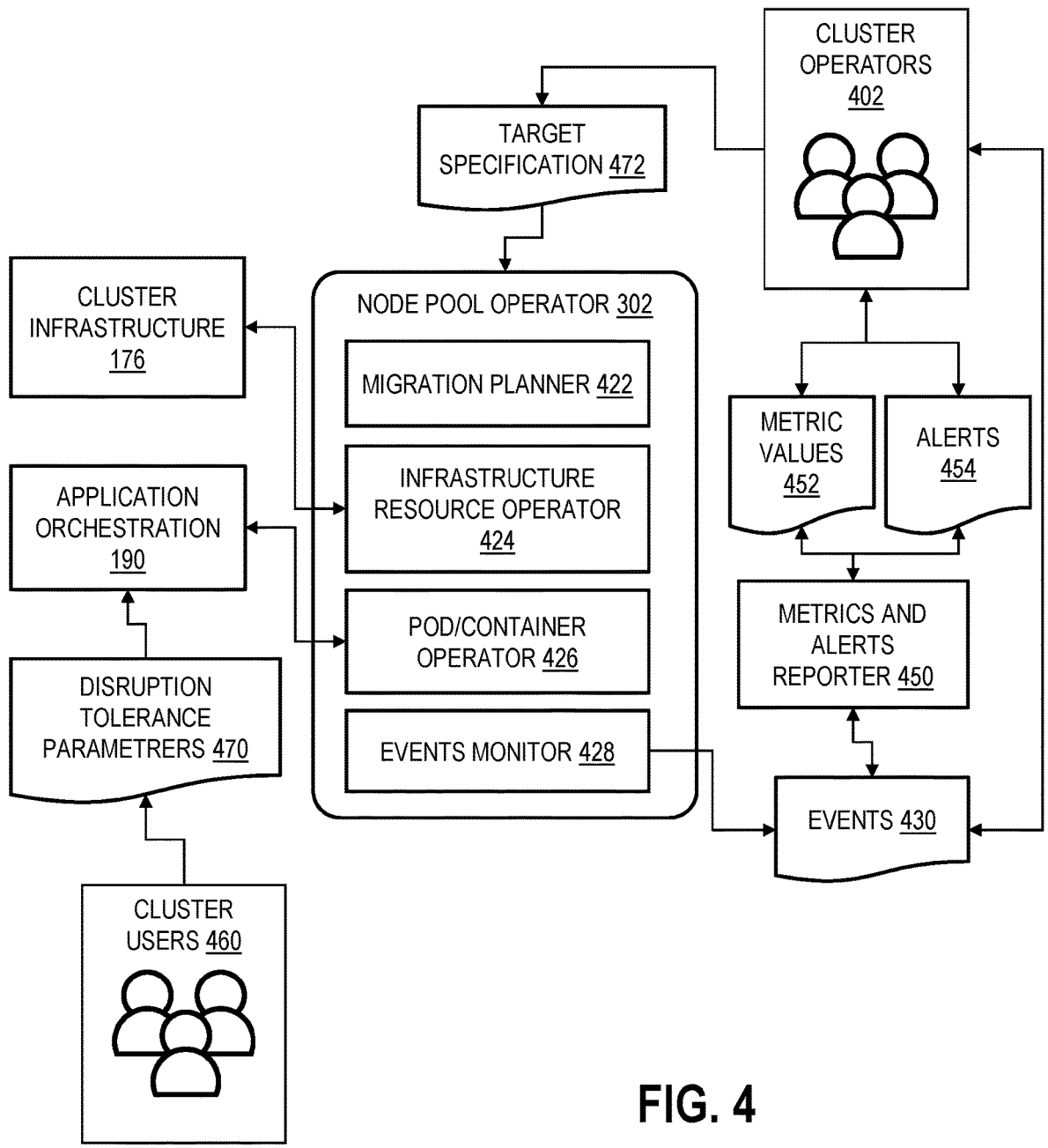
FIG. 4 illustrates a node pool operator, cluster operators, and cluster users, according to some aspects of the disclosed technology.

FIG. 4 illustrates a node pool operator 302, cluster operators 402, and cluster users 460, according to some aspects of the disclosed technology. Node pool operator 302 may include one or more of: migration planner 422, infrastructure resource operator 424, pod/container operator 426, and events monitor 428. These components illustrate core functions or tasks of the node pool operator 302, which can be queued and performed by workers in a cluster infrastructure.

Node pool operator 302 may receive a request from a cluster operator (e.g., one of cluster operators 402) to update an existing node pool of a cluster. The request may seek to update a configuration of the nodes across a node pool. The request may have, indicate, or specify a target specification 472 or a target/desired configuration.

The request may include an update to an immutable property of an existing node pool or immutable property of the nodes in the existing node pool. The property may be considered immutable because the application orchestration 190 does not or cannot support an in-place update of the immutable property. For example, the request to update the existing node pool may include a change to a computing resource type of the existing node pool (e.g., kind/type of processor resources allocated to the nodes of the node pool). In another example, the request to update the existing node pool may include a change to a version of an application orchestration software implemented on the existing node pool. In yet another example, the request to update the existing node pool may include a security update to the existing node pool (e.g., a change in security settings for the nodes in the node pool, a patch or code fix to the security software running on nodes in the node pool, etc.).

Because in-place update is not possible, node pool operator 302 may cause a new node pool meeting the target specification to be created, and execute a migration plan to move pods running on the existing node pool to be migrated in a windowed and monitored fashion to the new node pool. Migration planner 422 may determine a migration plan. In some cases, the migration planner 422 may determine or define a migration plan based on one or more characteristics of the pods running on the existing node pool. In some cases, the migration planner may determine or define a migration plan based on input provided by the cluster operator 402.

The migration plan being determined or defined can be adjusted based on the sensitivity of the pods running on the existing node pool to disruption. Specifically, a window size of the windowed migration of the migration plan can be adjusted based on the sensitivity and/or other factors. The window size parameter is used to divide the number of nodes in the node pool into windows. If a node pool has 100 nodes and window size is 10 nodes, then the node pool is divided into 10 windows having 10 nodes each. Window size may be larger if the pods are less sensitive to disruption (e.g., pods in a replica set with a low pod disruption budget, one-shot processing workloads, etc.). Window size may be smaller if the pods are more sensitive to disruption (e.g., long-lived applications such as web applications, ingress nodes/controllers, etc.). Window size may also be limited by what is allowed by application orchestration 190. In some cases, the window size is limited or determined based on the one or more characteristics of the pods running on the existing node pool. In some cases, the window size is limited or specified by the cluster operators 402.

Indicators or heuristics for sensitivity of pods to disruption may be implicit or explicit. Implicit indicators may include whether the pods have long-lived job(s), short-lived jobs(s), ingress controller, machine-learning training job(s) (e.g., training jobs of ML platform 154 of FIG. 1), mapping data processing job(s) (e.g., map data processing jobs of map management platform 162 of FIG. 1), autonomous vehicle simulation job(s) (e.g., jobs of simulation platform 156 of FIG. 1), web application(s) (e.g., web application of ride-hailing/ridesharing platform 160 of FIG. 1). Long-lived jobs and short-lived jobs may be specified as expected run time or maximum time to live (e.g., specified by cluster users in disruption tolerance parameters 470). Explicit indicators may include a pod disruption budget of pods in a replica set of a deployment (e.g., specified by cluster users 460 in disruption tolerance parameters 470). A pod disruption budget can define a minimum number of replicas to be running at a given point in time, which can be an indicator for how sensitive the pods are to disruption. A pod disruption budget requiring a large number of replicas to be running at a given point in time may indicate that the pods are sensitive to disruption. The window size may be smaller to ensure that the minimum number of replicas are running in the existing node pool or the new node pool at any given point in time. Another explicit indicator may include whether a pod can be run on normal nodes or preemptive nodes. Pods that must be run on normal nodes and not on preemptive nodes may mean that the pods are sensitive to disruption, and cannot afford to be running on preemptive nodes.

Window size may be adjusted based on the indicators or heuristics. The migration planner 422 may determine the indicators or heuristics based on the characteristics of pods running on the existing node pool. The migration planner 422 may determine disruption tolerance parameters 470 of the pods running on the existing node pool, and utilize the disruption tolerance parameters 470 to determine the window size.

Executing the migration plan by node pool operator 302 may include performing migration in a windowed fashion. Executing the migration plan may include splitting nodes in the existing node pool into a plurality of windows according to a window size, and creating new nodes in the new node pool and migrating pods running in a given window in the existing node pool to the new node pool one window at a time. A windowed migration avoids the need to fully duplicate all of the nodes in the new node pool right away, and allows for resources to be recycled in the existing node pool as the migration is executed. Also, the window size being tunable to the sensitivity of the pods to disruption can reduce the risk of severe or intolerable disruptions to the pods during migration.

Node pool operator 302 may execute the determined migration plan by operating on or executing tasks on two aspects of the cluster: the infrastructure resources of the cluster, and the pods/containers running on the existing node pool. The request to update the node pool and creation of the new node pool to meet target specification may mean that new resources may need to be allocated to the cluster to accommodate the new node pool. Infrastructure resource operator 424 may, through an application programming interface of the cluster infrastructure 176 (or through an infrastructure manager), allocate resources to the cluster as needed during migration. Infrastructure resource operator 424 may also create the new node pool and configure the new node pool with new nodes during migration. Pod/container operator 426 may perform various tasks on pods/containers on the existing node pool and the new node pool, such as cordoning nodes in the existing node pool from being able to accept new pods, draining pods from nodes in the existing node pool, transmitting termination signals to pods running on the existing node pool, wait for pods on the existing node pool to complete the job, cause the pods to be restarted in the new nodes in the new node pool, etc.

Having an effective logging system for events during migration and having a meaningful alerts triggering system can greatly reduce the amount of time cluster operators 402 have to spend on maintaining the cluster infrastructure. Additionally, having a detailed log can offer more visibility of the migration process and status for cluster operators 402 and improve traceability if a migration fails. Events monitor 428 of node pool operator 302 may be implemented to log events, transitions, and/or state changes of the migration (generally referred to as events 430). The events 430 may be output or published to a metrics and alerts reporter 450. Metrics and alerts reporter 450 may process the events based on one or more metrics defined by the cluster operators 402 and generate metric values 452. Metrics and alerts reporter 450 may provide metric values 452 to cluster operators 402. One exemplary metric may include a duration of the migration or an operation being performed in the migration. Another exemplary metric may include a number of retries of an operation being performed in the migration. Another exemplary metric may include a progress indicator or level of the migration. Another exemplary metric may include a health indicator of the migration. Another exemplary metric may include a number of errors in the migration. Another exemplary metric may include a percentage or proportion of nodes or pods which have been successfully updated (e.g., migrated to the new node pool). Metrics and alerts reporter 450 may process one or more of: the events, and one or more metric values derived from the events, based on one or more alert triggers defined by the cluster operator, and generate alerts 454. Alert triggers may be defined based on if-statements. If the events and/or metrics meet a certain condition of an alert trigger, then one or more alerts 454 may be triggered to be sent to cluster operators 402. The metric values 452 and alerts 454 may be output or published to cluster operators 402 for further analysis and evaluation by the cluster operators 402. In some cases, events 430 may be output or published to cluster operators 402 for further analysis and evaluation by the cluster operators 402.

Examples of events 430 may include:
- a state of the node pool operator;
- a state of the existing node pool;
- a state of the new node pool;
- a state of an operation being performed on the existing node pool;
- a state of an operation being performed on the new node pool;
- a state of a last operation performed on the existing node pool;
- a state of a last operation performed on the new node pool;
- identification of a next operation to be performed by the node pool operator;
- identification of a next state expected by the node pool operator;
- whether the new node pool reconciles with the target specification;
- a state of a pod on the existing node pool;
- a state of a pod on the new node pool;
- a state of a node in the existing node pool;
- a state of a node in the new node pool;
- number of nodes in the existing node pool;
- number of nodes in the new node pool;
- number of nodes out of a total number of nodes in the node pool that have completed migration;
- amount of time a node has been draining;
- identity of a node being cordoned in the existing node pool;

identity of a node being drained in the existing node pool; and identity of a pod being migrated to the new node pool.

Events 430 preferably includes meaningful events, optionally as a time-stamped log. Events 430 may include one or more of: state information of node pools and nodes therein, identifications of operations being performed or to be performed, state information of operation being performed, identifications of pods being drained, state information of pods, etc. Events 430 provide a digest of migration plan status and progress.

Metrics and alerts reporter 450 may process the events based on one or more metrics defined by the cluster operators 402 and generate metric values 452. Metrics and alerts reporter 450 may metric values 452 to cluster operators 402. One exemplary metric may include a duration of the migration or an operation being performed in the migration. Another exemplary metric may include a number of retries of an operation being performed in the migration. Another exemplary metric may include a progress indicator or level of the migration. Another exemplary metric may include a health indicator of the migration. Another exemplary metric may include a number of errors in the migration. Another exemplary metric may include a percentage or proportion of nodes or pods which have been successfully updated (e.g., migrated to the new node pool). Metrics and alerts reporter 450 may process one or more of: the events, and one or more metric values derived from the events, based on one or more alert triggers defined by the cluster operator, and generate alerts 454. Alert triggers may be defined based on if-statements. If the events and/or metrics meet a certain condition of an alert trigger, then one or more alerts 454 may be triggered to be sent to cluster operators 402. The metric values 452 and alerts 454 may be output or published to cluster operators 402 for further analysis and evaluation by the cluster operators 402. In some cases, events 430 may be output or published to cluster operators 402 for further analysis and evaluation by the cluster operators 402.

Figure 5:
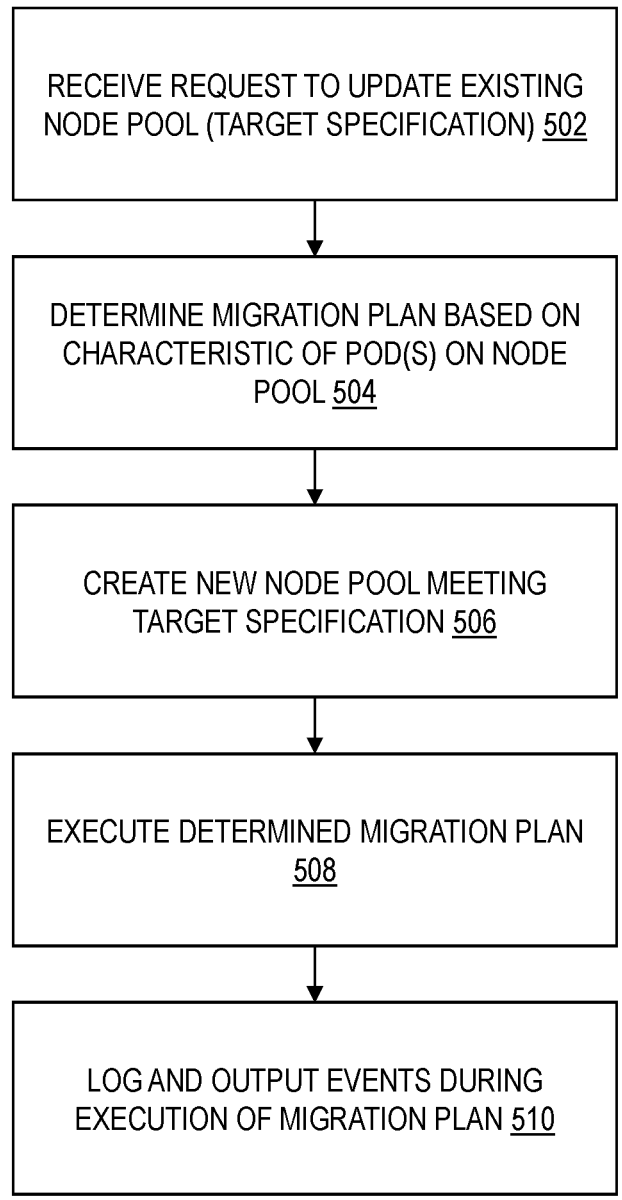
FIG. 5 is a flow diagram illustrating an exemplary computer-implemented method for maintenance of cluster infrastructure.

Exemplary Computer-Implemented Methods for Maintenance of Cluster Infrastructure FIG. 5 is a flow diagram illustrating an exemplary computer-implemented method for maintenance of cluster infrastructure. The method may be performed by node pool operator 302 and/or metrics and alerts reporter 450 as illustrated in the figures. In 502, a node pool operator may receive a request from a cluster operator to update an existing node pool, the request having a target specification. In 504, the node pool operator may determine a migration plan based on one or more characteristics of pods running on the existing node pool. In 506, the node pool operator may create a new node pool meeting the target specification. In 508, the node pool operator may execute the determined migration plan. In 510, the node pool operator may log and output events during the execution of the determined migration plan.

Figure 6:
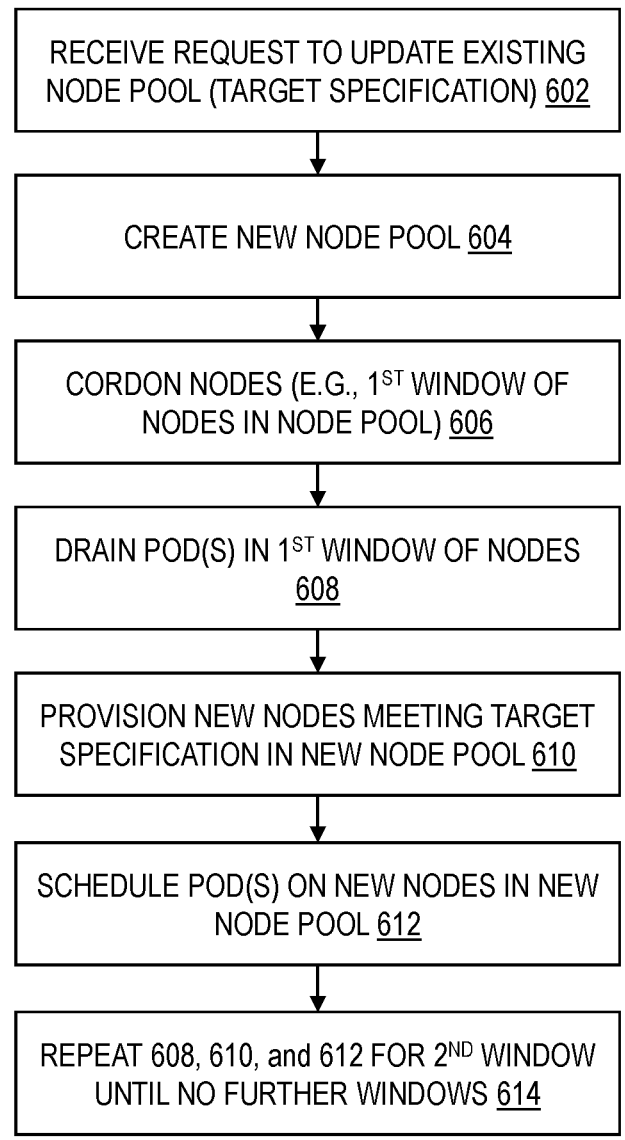
FIG. 6 is a flow diagram illustrating another exemplary computer-implemented method for maintenance of cluster infrastructure.

FIG. 6 is a flow diagram illustrating another exemplary computer-implemented method for maintenance of cluster infrastructure. The method may be performed by node pool operator 302 and/or metrics and alerts reporter 450 as illustrated in the figures. In some cases, the method illustrated in FIG. 6 may be particularly effective for tailoring and executing a migration plan that accommodates the pods' sensitivities to disruptions. A windowed migration may be suitable for pods that are sensitive to disruptions. In some cases, the pods running on the existing node pool may include long-lived jobs.

In 602, the node pool operator may receive a request from a cluster operator to update an existing node pool, the request having a target specification. In 604, the node pool operator may create a new node pool meeting the target specification. In 606, the node pool operator may cordon at least a subset of nodes or all of the nodes in the existing node pool. Cordoning prevents new pods from being added or deployed to a node. In 608, the node pool operator may drain one or more pods in a first window of nodes of the existing node pool. Draining a node can evict pod(s) from the node. Multiple nodes in the first window of nodes can be drained in parallel. In 610, the node pool operator may provision a first window of new nodes in the new node pool. The first window of new nodes may correspond to the first window of nodes being drained in the existing node pool. In some embodiments, the first window of new nodes may have the same number of nodes as the first window of nodes being drained in the existing node pool, but the specification/configuration of the nodes are different. An updated set of nodes meeting the target specification may be provisioned in the new node pool, e.g., as the pods in the first window of nodes are being drained. Accordingly, provisioning of new resources in the new node pool may be performed in a windowed fashion. In 612, the node pool operator may schedule one or more pods drained from the first window of nodes of the existing node pool to the first window of new nodes. Accordingly, migration of pods onto the new node pool may be performed in a windowed fashion as well.

In 614, the node pool operator may repeat 608 (draining), 610 (provisioning), and 612 (scheduling) for second or further window(s) of nodes, preferably serially through all windows of nodes. The repeating can continue until no further windows remain in the existing node pool. The repeating can continue until the existing node pool no longer has any nodes remaining. The repeating can continue until the new node pool has a number of nodes matching an original number of nodes of the existing node pool. The repeating can continue until pods running in the existing node pool have all been successfully scheduled on the new node pool. The repeating can continue until the migration plan has been executed fully and successfully.

In some cases, the first window of nodes may have a window size, and the window size may be specified by the cluster operator.

In some cases, the first window of nodes may have a window size, and the window size may be determined based on a disruption tolerance parameter of pods running in the existing node pool.

Figure 7:
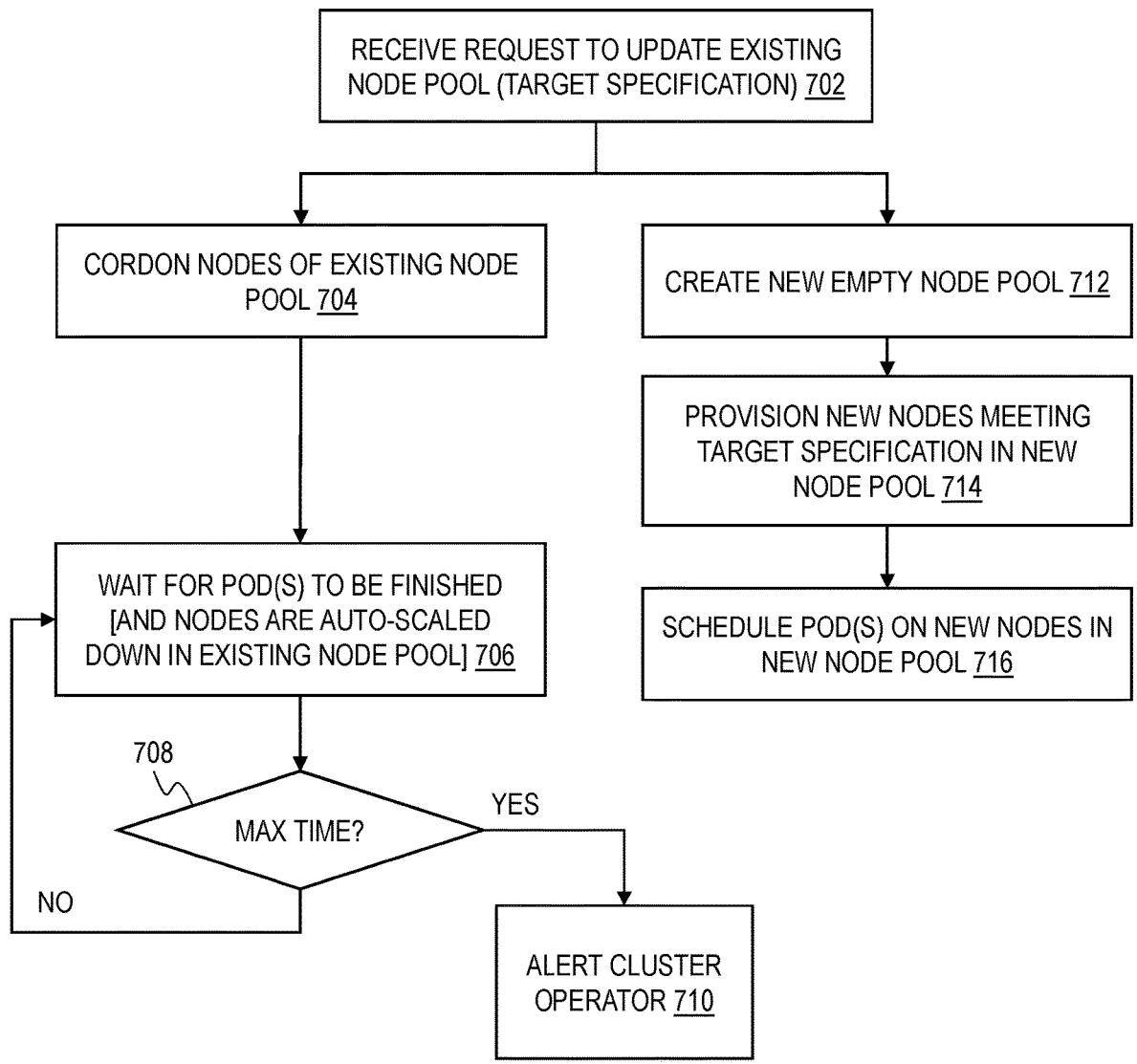
FIG. 7 is a flow diagram illustrating yet another exemplary computer-implemented method for maintenance of cluster infrastructure.

FIG. 7 is a flow diagram illustrating yet another exemplary computer-implemented method for maintenance of cluster infrastructure. The method may be performed by node pool operator 302 and/or metrics and alerts reporter 450 as illustrated in the figures. In some cases, the method illustrated in FIG. 7 may be particularly effective for updating node pools that have short-lived jobs (e.g., one-shot jobs/tasks with maximum time to live, machine-learning training jobs of ML platform 154 of FIG. 1, simulation jobs of simulation platform 156, etc.) deployed thereon.

In 702, a node pool operator may receive a request from a cluster operator to update an existing node pool, the request having a target specification. In some cases, a request to update the existing node pool may include a request to update a version of container orchestration software running on the existing node pool. In 704, the node pool operator may cordon all nodes of the existing node pool. In 706, the node pool operator may wait for one or more pods of the existing node pool to be finished. The node pool operator may wait for nodes to be recycled or auto-scaled-down in the existing node pool (e.g., wait for nodes having no pods running on the nodes of the existing node pool to be scaled-down by an auto-scaler of the cluster).

In 712, the node pool operator may create a new node pool meeting the target specification. In 714, the node pool operator may provision new nodes in the new node pool. In 716, the node pool operator may schedule new pods on new nodes in a new node pool, or allow new pods targeted for the updated node pool to be scheduled on the new node pool.

In 708, the node pool operator may check if the node pool operator has waited for too long for the pods to finish. For example, the node pool operator may keep track of a running time duration of the one or more pods. While waiting for the one or more pods of the existing node pools to be finished, the node pool operator may check whether a running time duration of the one or more pods exceeds a maximum time. In some cases, the maximum time is specified by a user of the existing node pool (e.g., in disruption tolerance parameters or the like). If the running time does not exceed the maximum time, then the method returns to 706 (NO path from 708). If the running time does exceed the maximum time, the method may proceed to 710. In 710, in response to a running time duration of the one or more pods exceeding a maximum time, the node pool operator may transmit an alert to the cluster operator that the maximum time has been exceeded. One or more events may be logged. One or more metrics may be generated.

Exemplary Processor-Based System

Figure 8:
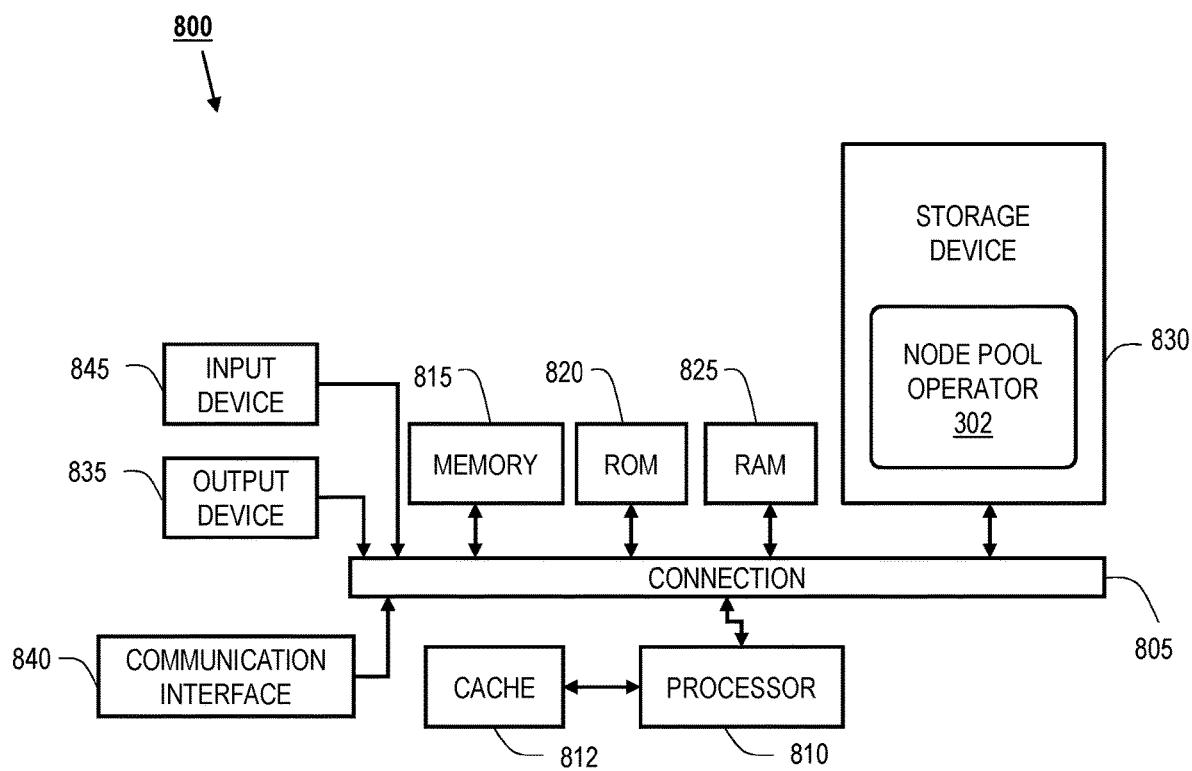
FIG. 8 illustrates an exemplary processor-based system with which some aspects of the subject technology may be implemented.

FIG. 8 illustrates an exemplary processor-based system with which some aspects of the subject technology may be implemented. For example, processor-based system 800 may be any computing device making up, or any component thereof in which the components of the system are in communication with each other using connection 805. Connection 805 may be a physical connection via a bus, or a direct connection into processor 810, such as in a chipset architecture. Connection 805 may also be a virtual connection, networked connection, or logical connection.

In some embodiments, computing system 800 represents the local computing device 110 of FIG. 1 and/or the parts of cluster infrastructure 176 in data center 150 of FIG. 1. In some embodiments, one or more of the described system components represents many such components each performing some or all of the function for which the component is described. In some embodiments, the components may be physical or virtual devices.

Exemplary system 800 includes at least one processing unit (e.g., a CPU or another suitable processor) 810 and connection 805 that couples various system components including system memory 815, such as Read-Only Memory (ROM) 820 and Random-Access Memory (RAM) 825 to processor 810. Computing system 800 may include a cache of high-speed memory 812 connected directly with, in close proximity to, or integrated as part of processor 810.

Processor 810 may include any general-purpose processor and a hardware service or software service, such as executable instructions that implement functionalities such as methods and processes described herein. The functionalities carried out by node pool operator 302 may be encoded as instructions in storage device 830. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms known to those of skill in the art. In some instances, multimodal systems may enable a user to provide multiple types of input/output to communicate with computing system 800. Computing system 800 may include communications interface 840, which may generally govern and manage the user input and system output. The communication interface may perform or facilitate receipt and/or transmission of wired or wireless communications via wired and/or wireless transceivers.

Storage device 830 may be a non-volatile and/or non-transitory and/or computer-readable memory device and may be a hard disk or other types of computer-readable media which may store data that are accessible by a computer.

Storage device 830 may include software services, servers, services, etc., that when the code that defines such software is executed by the processor 810, causes the system 800 to perform a function. In some embodiments, a hardware service that performs a particular function may include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

SELECT EXAMPLES

Example 1 is a computer-implemented method for maintenance of cluster infrastructure, comprising: receiving, at a node pool operator, a request from a cluster operator to update an existing node pool, the request having a target specification representing a change in a configuration of the existing node pool; determining a migration plan based on one or more characteristics of pods running on the existing node pool; creating a new node pool meeting the target specification; executing the determined migration plan; and logging and outputting events during the execution of the determined migration plan.

In Example 2, the computer-implemented method of Example 1 can optionally include the request to update the existing node pool comprising a change to a computing resource type of the existing node pool.

In Example 3, the computer-implemented method of Example 1 or 2 can optionally include the request to update the existing node pool comprising a change to a version of an application orchestration software implemented on the existing node pool.

In Example 4, the computer-implemented method of any one of Examples 1-3 can optionally include the request to update the existing node pool comprising a security update to existing node pool.

In Example 5, the computer-implemented method of any one of Examples 1-4 can optionally include determining the migration plan comprising: determining whether the one or more characteristics of pods running on the existing node pool indicates the pods comprise a long-lived job.

In Example 6, the computer-implemented method of any one of Examples 1-5 can optionally include determining the migration plan comprising: determining whether the one or more characteristics of pods running on the existing node pool indicates the pods comprise a short-lived job.

In Example 7, the computer-implemented method of any one of Examples 1-6 can optionally include determining the migration plan comprising: determining whether the one or more characteristics of pods running on the existing node pool indicates the pods comprise an ingress controller.

In Example 8, the computer-implemented method of any one of Examples 1-7 can optionally include determining the migration plan comprising: determining whether the one or more characteristics of pods running on the existing node pool indicates the pods comprise a machine-learning training job.

In Example 9, the computer-implemented method of any one of Examples 1-8 can optionally include determining the migration plan comprising: determining whether the one or more characteristics of pods running on the existing node pool indicates the pods comprise a mapping data processing job.

In Example 10, the computer-implemented method of any one of Examples 1-9 can optionally include determining the migration plan comprising: determining whether the one or more characteristics of pods running on the existing node pool indicates the pods comprise an autonomous vehicle simulation job.

In Example 11, the computer-implemented method of any one of Examples 1-10 can optionally include determining the migration plan comprising: determining whether the one or more characteristics of pods running on the existing node pool indicates the pods comprise a web application.

In Example 12, the computer-implemented method of any one of Examples 1-11 can optionally include determining the migration plan comprising: determining disruption tolerance parameters of the pods running on the existing node pool.

In Example 13, the computer-implemented method of any one of Examples 1-12 can optionally include executing the determined migration plan comprising: splitting nodes in the existing node pool into a plurality of windows according to a window size; and creating new nodes in the new node pool and migrating pods running in a given window in the existing node pool to the new node pool, one window at a time.

In Example 14, the computer-implemented method of Example 13 can optionally include the window size being specified by the cluster operator.

In Example 15, the computer-implemented method of Example 13 can optionally include the window size being determined based on the one or more characteristics of the pods running on the existing node pool.

In Example 16, the computer-implemented method of any one of Examples 1-15 can optionally include the events indicating one or more of the following: state information of the existing node pool, state information of the new node pool, and state information of operations performed on pods.

In Example 17, the computer-implemented method of any one of Examples 1-16 can optionally include processing the events based on one or more metrics defined by the cluster operator.

In Example 18, the computer-implemented method of any one of Examples 1-17 can optionally include processing one or more of: the events, and one or more metric values derived from the events, based on one or more alert triggers defined by the cluster operator.

Example 19 is a computer-implemented method for maintenance of cluster infrastructure, comprising: receiving, at a node pool operator, a request from a cluster operator to update an existing node pool, the request having a target specification representing a change in a configuration of the existing node pool; creating a new node pool meeting the target specification; cordoning at least a subset of nodes in the existing node pool; draining one or more pods in a first window of nodes of the existing node pool; provisioning a first window of new nodes in the new node pool, wherein the first window of new nodes correspond to the first window of nodes being drained in the existing node pool; and scheduling one or more pods drained from the first window of nodes of the existing node pool to the first window of new nodes.

In Example 20, the computer-implemented method of Example 19 can optionally include repeating the draining, provisioning, and scheduling for a second windows of nodes.

In Example 21, the computer-implemented method of Example 19 or 20 can optionally include: repeating the draining, provisioning, and scheduling for one or more further windows of nodes until: the existing node pool no longer has any nodes, the new node pool has a number of nodes matching an original number of nodes of the existing node pool, and pods running in the existing node pool have all been successfully scheduled on the new node pool.

In Example 22, the computer-implemented method of any one of Examples 19-21 can optionally include the first window of new nodes having a same number of nodes as the first window of nodes being drained in the existing node pool.

In Example 23, the computer-implemented method of any one of Examples 19-22 can optionally include the first window of nodes having a window size, and the window size is specified by the cluster operator.

In Example 24, the computer-implemented method of any one of Examples 19-22 can optionally include the first window of nodes having a window size, and the window size is determined based on a disruption tolerance parameter of pods running in the existing node pool.

In Example 25, the computer-implemented method of any one of Examples 19-24, wherein pods running on the existing node pool comprise long-lived jobs.

Example 26 is a computer-implemented method for maintenance of cluster infrastructure, comprising: receiving, at a node pool operator, a request from a cluster operator to update an existing node pool, the request having a target specification representing a change in a configuration of the existing node pool; cordoning all nodes of the existing node pool; waiting for one or more pods of the existing node pool to be finished; creating a new node pool meeting the target specification; provisioning new nodes in the new node pool; and scheduling new pods on new nodes in new node pool.

In Example 27, the computer-implemented method of Example 26 can optionally include waiting for nodes having no pods running on the nodes of the existing node pool to be scaled-down by an auto-scaler.

In Example 28, the computer-implemented method of Example 26 or 27 can optionally include pods running on the existing node pool comprising short-lived jobs.

In Example 29, the computer-implemented method of any one of Examples 26-28 can optionally include the request to update the existing node pool comprising a request to update a version of container orchestration software running on the existing node pool.

In Example 30, the computer-implemented method of any one of Examples 26-29 can optionally include while waiting for the one or more pods of the existing node pools to be finished, checking whether a running time duration of the one or more pods exceeds a maximum time.

In Example 31, the computer-implemented method of Example 30 can optionally include the maximum time being specified by a user of the existing node pool.

In Example 32, the computer-implemented method of Example 30 or 31 can optionally include in response to the running time duration of the one or more pods exceeding the maximum time, transmitting an alert to the cluster operator that the maximum time has been exceeded.

Example A is a computing system, comprising: one or more processors; one or more storage devices to store instructions executable by the one or more processors; and one or more components (e.g., node pool operator 302) encoded in the instructions to perform any one of the computer-implemented methods in Examples 1-32.

Example B has one or more non-transitory computer-readable medium having instructions stored thereon, that when executed by one or more processors, cause the one or more processors to perform any one of the computer-implemented methods in Examples 1-32.

Example C is an apparatus comprising means to carry out or perform any one of the computer-implemented methods in Examples 1-32.

What is claimed is:

1. A computer-implemented method for maintenance of cluster infrastructure, comprising:
   receiving, at a node pool operator, a request from a cluster operator to update an existing node pool, the request having a target specification representing a change in a configuration of the existing node pool;
   determining a migration plan based on disruption tolerance parameters of pods running on the existing node pool;
   creating a new node pool meeting the target specification;
   executing the determined migration plan by:
      splitting nodes in the existing node pool into a plurality of windows according to a window size; and
      creating new nodes in the new node pool and migrating pods running in a given window in the existing node pool to the new node pool, one window at a time; and
   logging and outputting events during the execution of the determined migration plan.

2. The computer-implemented method of claim 1, wherein the window size is specified by the cluster operator.

3. The computer-implemented method of claim 1, wherein the window size is determined based on one or more characteristics of the pods running on the existing node pool.

4. The computer-implemented method of claim 1, wherein the events indicate one or more of the following:
   state information of the existing node pool, state information of the new node pool, and state information of operations performed on pods.

5. The computer-implemented method of claim 1, further comprising:
   processing the events based on one or more metrics defined by the cluster operator.

6. The computer-implemented method of claim 1, further comprising:
   processing one or more of: the events, and one or more metric values derived from the events, based on one or more alert triggers defined by the cluster operator.

7. A computer-implemented method for maintenance of cluster infrastructure, comprising:
   receiving, at a node pool operator, a request from a cluster operator to update an existing node pool, the request having a target specification representing a change in a configuration of the existing node pool;
   creating a new node pool meeting the target specification;
   cordoning at least a subset of nodes in the existing node pool;
   draining one or more pods in a first window of nodes of the existing node pool;
   provisioning a first window of new nodes in the new node pool, wherein the first window of new nodes correspond to the first window of nodes being drained in the existing node pool; and
   scheduling one or more pods drained from the first window of nodes of the existing node pool to the first window of new nodes.

8. The computer-implemented method of claim 7, further comprising:

repeating the draining, provisioning, and scheduling for a second window of nodes.

9. The computer-implemented method of claim 7, further comprising:
repeating the draining, provisioning, and scheduling for one or more further windows of nodes until:
the existing node pool no longer has any nodes, the new node pool has a number of nodes matching an original number of nodes of the existing node pool, and pods running in the existing node pool have all been successfully scheduled on the new node pool.

10. The computer-implemented method of claim 7, wherein the first window of new nodes have a same number of nodes as the first window of nodes being drained in the existing node pool.

11. The computer-implemented method of claim 7, wherein the first window of nodes has a window size, and the window size is specified by the cluster operator.

12. The computer-implemented method of claim 7, wherein the first window of nodes has a window size, and the window size is determined based on a disruption tolerance parameter of pods running in the existing node pool.

13. The computer-implemented method of claim 7, wherein pods running on the existing node pool comprise long-lived jobs.

14. A computer-implemented method for maintenance of cluster infrastructure, comprising:
receiving, at a node pool operator, a request from a cluster operator to update an existing node pool, the request having a target specification representing a change in a configuration of the existing node pool;
cordoning all nodes of the existing node pool;
waiting for one or more pods of the existing node pool to be finished;
creating a new node pool meeting the target specification;
provisioning new nodes in the new node pool; and
scheduling new pods on new nodes in the new node pool.

15. The computer-implemented method of claim 14, further comprising:
waiting for nodes having no pods running on the nodes of the existing node pool to be scaled-down by an autoscaler.

16. The computer-implemented method of claim 14, wherein pods running on the existing node pool comprise short-lived jobs.

17. The computer-implemented method of claim 14, wherein the request to update the existing node pool comprises a request to update a version of container orchestration software running on the existing node pool.

18. The computer-implemented method of claim 14, further comprising:
while waiting for the one or more pods of the existing node pools to be finished, checking whether a running time duration of the one or more pods exceeds a maximum time; and
in response to the running time duration of the one or more pods exceeding the maximum time, transmitting an alert to the cluster operator that the maximum time has been exceeded.

* * * * *